UNITED STATES PATENT OFFICE.

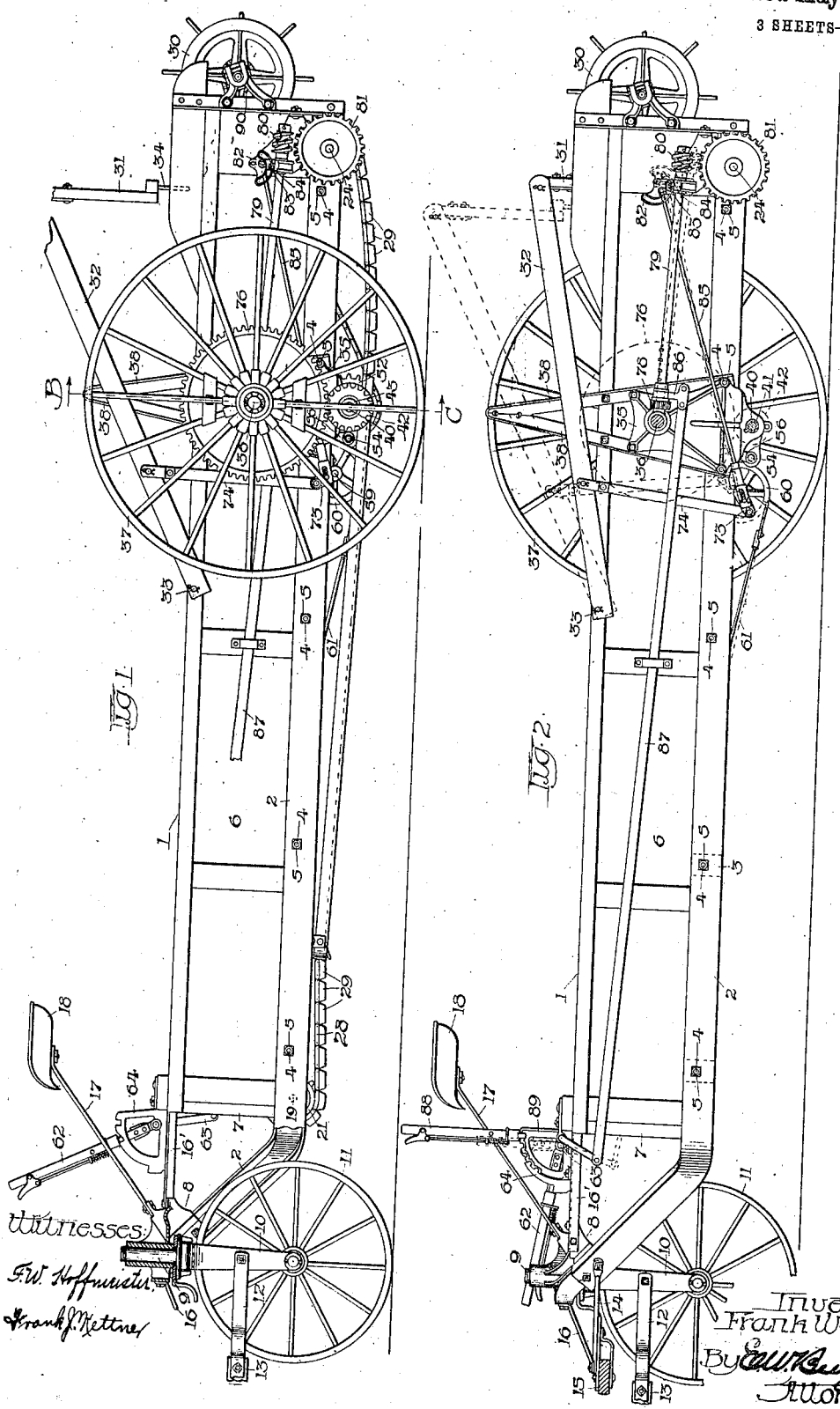

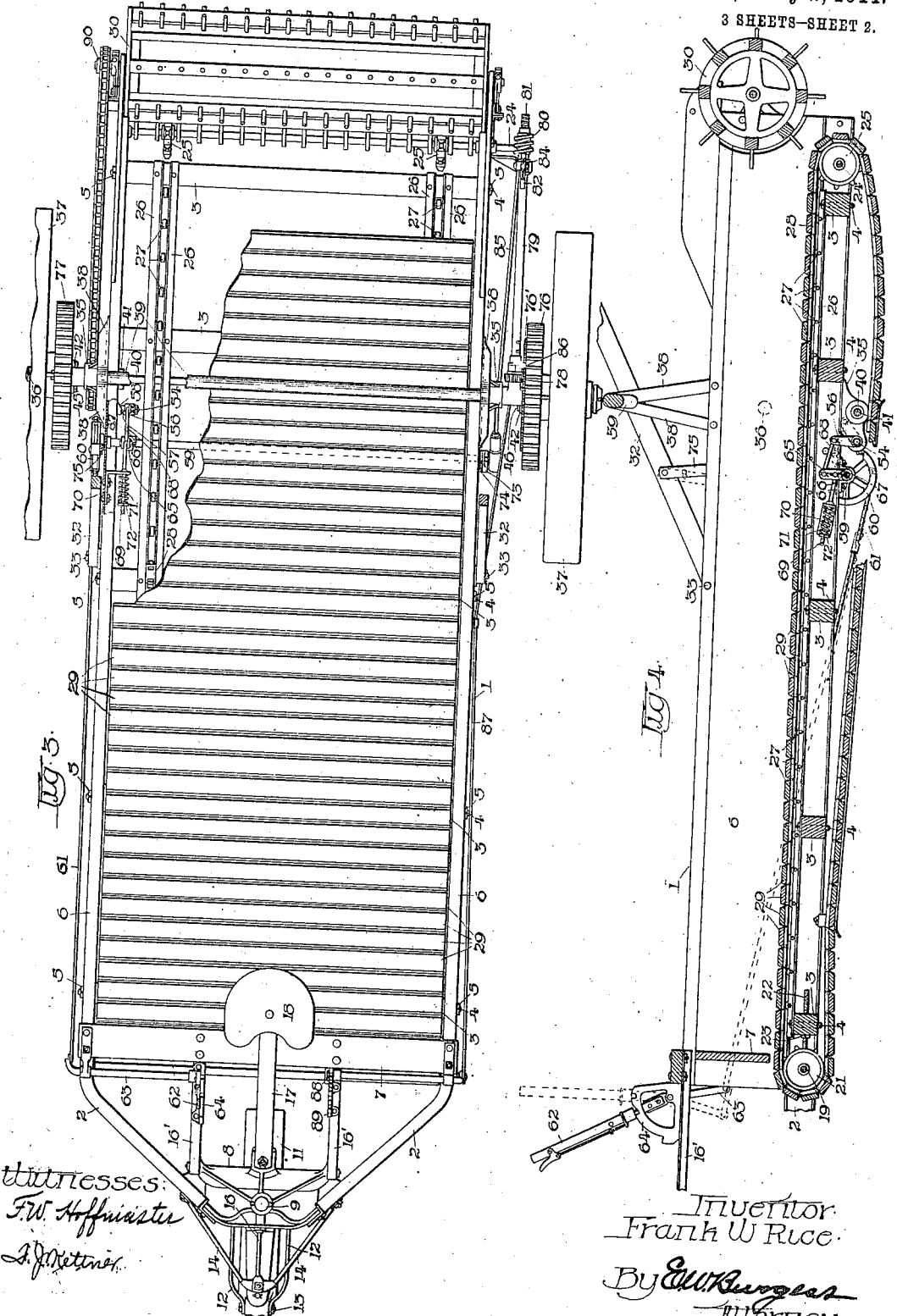

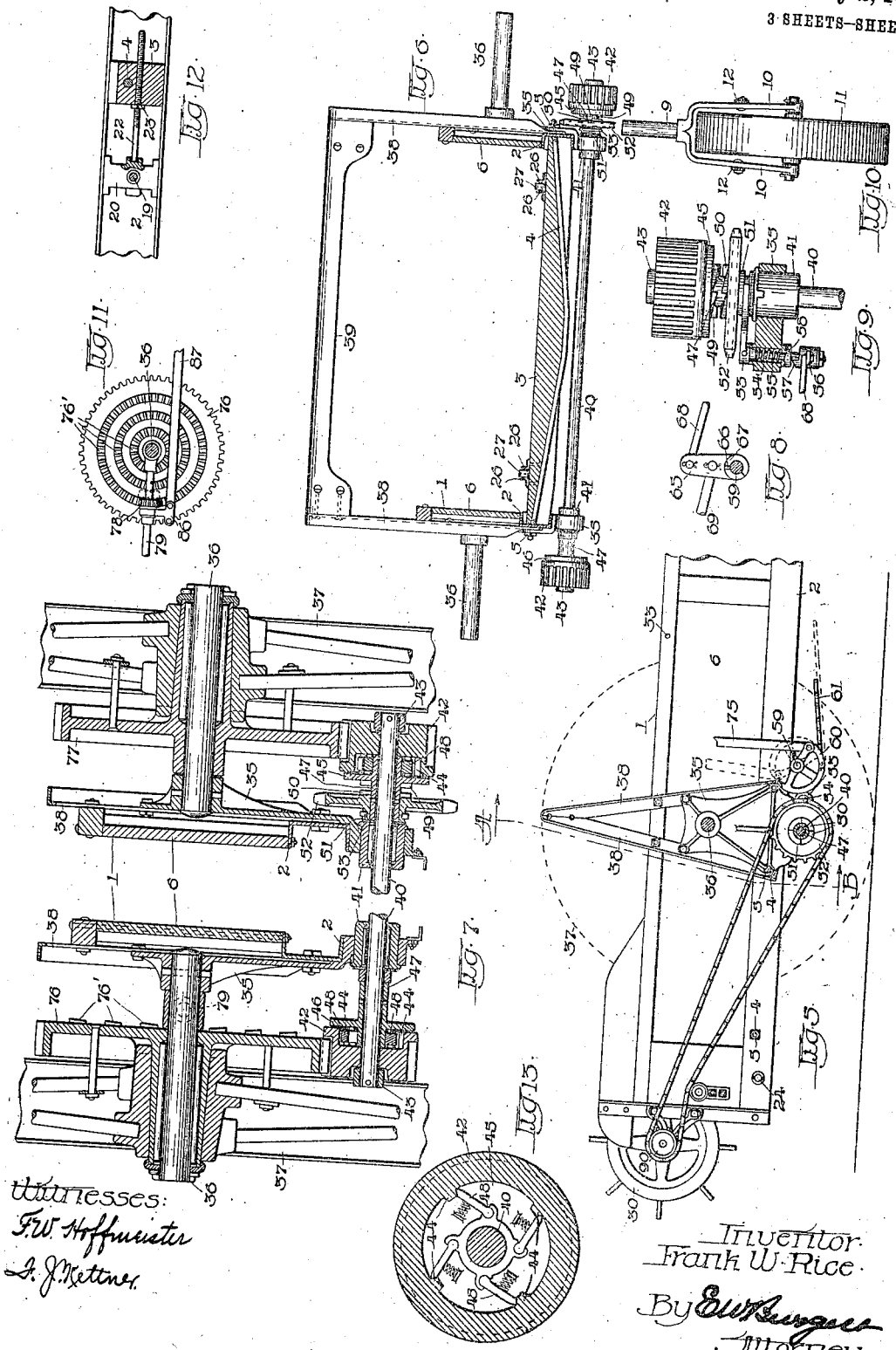

FRANK W. RICE, OF SPRINGFIELD, OHIO, ASSIGNOR TO INTERNATIONAL HARVESTER COMPANY, A CORPORATION OF NEW JERSEY.

MANURE-SPREADER.

990,903.  Specification of Letters Patent.  Patented May 2, 1911.

Application filed May 27, 1909. Serial No. 498,641.

*To all whom it may concern:*

Be it known that I, FRANK W. RICE, a citizen of the United States, residing at Springfield, in the county of Clark and State of Ohio, have invented certain new and useful Improvements in Manure-Spreaders, of which the following is a specification.

My invention relates to manure spreaders having a receptacle into which the material is loaded, and means operative within the receptacle and deriving motion from the carrying wheels for delivering the material therefrom; its object being to provide a construction having as its principal feature a receptacle mounted in a manner to be close to the surface of the ground for convenience in loading the material therein, and having a distributing mechanism in position to deliver the material at a less distance from the ground in order that its distribution may not be affected by the wind in an objectionable manner, as in machines of the above class as commonly constructed. I attain this object by means of the mechanism described in the accompanying drawings, in which—

Figure 1 represents a side elevation of a manure spreader embodying my invention; Fig. 2 is a like view having some of the parts removed; Fig. 3 is a top view of the spreader, having a portion broken away for the purpose of illustration; Fig. 4 is a longitudinal sectional elevation of part of Fig. 3; Fig. 5 is a side elevation, partly in section, of the rear portion of the spreader; Fig. 6 is a cross section on the line A—B of Fig. 5; Fig. 7 is an enlarged detail drawing representing a partial cross section along the line B—C of Fig. 1; Fig. 8 is a detached detail drawing of part of the clutch controlling means; Fig. 9 is a detached detail representing a top plan view of a clutch mechanism forming part of the power transmitting means; Fig. 10 represents a caster wheel mechanism used as a means for supporting the forward end of the receptacle; Fig. 11 is a side elevation of part of the speed changing mechanism; Fig. 12 is a detached detail of the carrier adjusting mechanism; and Fig. 13 is a detail, partly in section, representing a part of the pawl and ratchet clutch mechanism between the power transmitting shaft and its actuating pinions.

Like reference characters designate the same parts throughout the several views.

1 represents a receptacle having longitudinal bed frame members 2 of channel section upon opposite sides thereof, transverse bed frame members 3 having their opposite ends received by the channels in members 2 and secured therein by means of truss rods 4 that have a central bearing upon the lower sides of the transverse members and their opposite ends inclined upward and, passing through openings in the side members, are provided with securing nuts 5.

6 represents the sides of the receptacle, and 7 the forward end thereof. The bed frame members 2 extend beyond the forward end of the receptacle and are inclined upward and inward, forming a triangular structure, having their forward ends secured to a casting 8 that forms a bearing block for a vertically journaled spindle 9, having fork members 10 secured thereto, and 11 represents a caster wheel journaled at the lower ends of the fork members.

12 represents bars having their rear ends secured to the fork members upon opposite sides of the wheel and their forward ends to a tongue member 13. Draft members 14 have their rear ends secured to bed frame members 2 and their forward ends with a draft evener 15, and 16 represents a supplemental draft member inclined upward from front to rear and having its rear end secured to casting 8 and its forward end with the draft evener.

16¹ represents bars connecting the upper side of the forward end of the receptacle with casting 8.

17 represents a seat spring having its lower end secured to the casting 8, and a seat 18 is secured to its upper end.

A transverse shaft 19 is journaled in bearing boxes 20 slidably mounted upon the side frame members at the forward end of the receptacle and having sprocket wheels 21 secured thereto near opposite ends thereof, and 22 represents adjusting rods having one end connected with the bearing boxes and their opposite ends threaded and adjustably received by the front transverse bed frame member.

23 represents adjusting nuts threaded upon the rods.

24 represents a transverse shaft journaled at the rear end of the receptacle and having sprocket wheels 25 secured thereto.

26 represents angle bars secured to the upper sides of the transverse bed frame members, having their vertical legs spaced apart, and 27 represents rollers journaled in said bars and adapted to support chains 28 passing around sprocket wheels 21 and 25, and 29 represent carrier apron members secured to the chains, the whole constituting a movable bottom for the receptacle and adapted to deliver the material therefrom.

30 represents a distributing cylinder journaled at the rear end of the receptacle above the movable bottom, and 31 represents an end-gate pivotally connected to the rear ends of the levers 32, said levers having their forward ends pivotally connected with opposite sides of the receptacle at 33 and adapted to rise and fall in a manner to cause the end-gate to operate as a shield for the distributing cylinder during the loading operation, the gate being provided with teeth 34 projecting downward from its lower edge and operative as a comb when the gate is raised to assist the disintegrating operation of the cylinder.

Secured to opposite sides of the receptacle, intermediate its ends, are castings 35, and projecting laterally therefrom, and secured thereto, are stub axles 36, located above the movable bottom of the receptacle, and 37 represents carrying wheels journaled upon said axles. The vertical members 38 are secured to said castings and to the sides of the receptacle and, converging as they extend upward, have their upper ends connected by means of a transverse axle supporting bar 39 above the receptacle, forming, with one of the transverse bed frame members 3, below the movable bottom, a two-part supporting axle, having the receptacle for the manure and its movable bottom located between the two parts.

A transverse power transmitting shaft 40 is journaled in bearings 41 received by openings at the lower ends of castings 35, and 42 represent pinions loosely mounted upon opposite ends of the shaft, and 43 represents collars secured to the shaft and retaining the pinions thereon. The pinions are provided with inwardly projecting rim portions, having the ratchet teeth 44 formed thereon, and 45 and 46 represent pawl carrying plates having hub portions 47, by means of which they are secured to the shaft, and 48 represents spring pressed pawls pivotally mounted upon the plates and adapted to engage with the ratchet teeth upon the pinions in an operative manner when the shaft 40 is rotated in one direction, and to be inoperative when the shaft is caused to rotate in an opposite direction; the mechanism as described forming a differential driving gear connection between the shaft and pinions. One of said plates, 45, is provided with clutch teeth 49 upon its inner face that are adapted to engage with complemental clutch teeth 50 formed upon the outer end of the hub portion 51 of a sprocket wheel 52 slidably mounted upon the hub of the pawl carrying plate 45.

53 represents a clutch shipping fork having its forked end received by a groove in the periphery of the hub of the sprocket wheel and its opposite end secured to a stem 54 slidably mounted parallel with the shaft 40 in a fixed part of the machine and having a coiled spring 55 surrounding it and operative to move the fork and sprocket wheel in a manner to cause the clutch teeth of the two members to be operatively engaged. 56 represents a lever arm rotatably mounted upon the opposite end of the stem and having its hub portion provided with a cam surface 57 adapted to engage with a corresponding cam surface 58 formed on the bearing for the stem in a manner to cause said fork and sprocket to move in an opposite direction when said lever arm is moved in one direction around said stem.

59 represents a transverse rock shaft parallel with the shaft 40 and journaled in bearings secured to the bed frame of the machine, and having secured to one end thereof a wheel segment 60.

61 represents a flexible member having one end connected with the rim of the segment and its opposite end with a hand lever 62 pivotally mounted upon the machine at the front end of the receptacle by means of a rod 63, the end of the lever coöperating with a common form of toothed sector 64 in a manner to hold the rock shaft in adjusted position.

65 represents a lever arm secured to the rock shaft inside of the bed frame member in a manner to have a limited rotative movement upon the shaft, its movement being controlled by means of a pin 66 in the shaft and the shoulder portion 67 on the hub of the arm, the arm being connected with the lever arm 56 by means of a link 68, and 69 represents a link having one end connected with the arm 65 and its opposite end slidably received by a bracket 70 secured to the bed frame, and 71 represents a coiled spring surrounding the rod and operative between an adjusting nut 72 and the bracket in a manner to swing the arm 65 in a direction to disengage the clutch mechanism. 73 represents a lever arm secured to the opposite end of the rock shaft, and 74 represents a link connection between said arm and one of the end-gate operating levers 32, and 75 represents a like connection between the wheel segment and the other lever upon the opposite side of the machine.

76 and 77 represent gear members secured to the carrying wheels 37 and meshing with the pinions 42, the gear member 76 having radially arranged teeth in a series of concentric circles $76^1$ relative to the axis of the gear member upon its inner face, and having variable radii, and 78 represents a pinion slidably mounted upon one end of a longitudinally arranged shaft 79 journaled upon the side of the receptacle, the pinion being adapted to engage with either of the series of circles of teeth in a manner to give a variable speed to the shaft, the opposite end of which is provided with a worm 80 adapted to engage a worm wheel 81 secured to the end of shaft 24, the worm being caused to engage or disengage with the wheel by a falling or rising movement of the shaft 79, which movement is controlled by means of a locking member 82, having a cam slot therein to receive the member 83 connected with the bearing 84 in which the shaft is journaled, the member 82 being connected with lever arm 73 by means of a link 85.

Means whereby the pinion 78 may be adjusted along the shaft in a manner to engage with either of the series of the concentric circles of teeth include a depending bracket 86 connected with the pinion and having secured thereto the rear end of a bar 87, the forward end of the bar being connected with a hand lever 88 pivotally connected with the receptacle at its forward end, the hand lever coöperating with a toothed sector 89 in a common way to secure the pinion in adjusted relation with the toothed surface of the gear member 76.

Motion is transmitted to the distributing cylinder by means of a sprocket chain connecting sprocket wheel 52 with a sprocket wheel 90 secured to the shaft of the distributing cylinder.

In operation, the initial position of the hand lever 62 is as shown in Fig. 2, with the end-gate in position as a shield for the distributing cylinder and the shaft 79 raised at its outer end in a manner to disengage the worm and worm wheel 81. When the lever is rearward to the position shown in Fig. 1 the rock shaft 59 turns in its bearings and causes the links 74 and 75 to raise the end-gate levers 32 in a manner to raise the end-gate, the initial turning movement of the rock shaft having no effect upon the clutch controlling member 61 until the shoulder thereof contacts with the pin 66, and then a further movement of the hand lever rearward will cause the clutch controlling lever to move in a direction permitting the sprocket 52 to engage with the clutch teeth upon the pawl carrying plate 45 in a manner to give rotative movement to the distributing cylinder, and simultaneously with such rotative movement of the rock shaft the worm 80 is caused to engage with the wheel 81 in a manner to cause the material to advance toward the distributing cylinder, and by manipulating the hand lever 88 the operator may control its speed.

What I claim as my invention, and desire to secure by Letters Patent, is:

1. A manure spreader including, in combination, a receptacle, means along the bottom thereof operative to deliver the material therefrom, axles projecting outward from the sides and above the bottom thereof, and transverse axle supporting members connecting the sides of said receptacle above and below said axles.

2. A manure spreader including, in combination, a receptacle, means along the bottom thereof operative to deliver the material therefrom, axles projecting outward from the sides and above the bottom thereof, a vertical member secured to the sides of said receptacle and having said axles secured thereto, and transverse members connecting said vertical member above and below said axles.

3. A manure spreader including, in combination, a receptacle, carrier mechanism operative along the bottom thereof in a manner to convey the material toward one end, carrying wheels, an axle having said carrying wheels mounted thereon, said axle having upper and lower members that receive said receptacle and said carrier mechanism between them.

4. A manure spreader including, in combination, a receptacle, an endless carrier mechanism operative along the bottom thereof in a manner to convey the material toward one end, carrying wheels, an axle having said carrying wheels mounted thereon, said axle having upper and lower members that receive said receptacle and the conveying portion of said carrier between them.

5. A manure spreader including, in combination, axle members, a receptacle, said receptacle including bed frame members upon opposite sides thereof and below said axle members, said bed frame members being inclined inward and upward at their forward ends and connected together, a distributing cylinder at the rear end of said receptacle, and means operative along the bottom thereof in a manner to convey the material to said cylinder.

6. A manure spreader including, in combination, axle members, a receptacle, said receptacle including bed frame members upon opposite sides thereof and below said axle members, said bed frame members being inclined inward and upward at their forward ends, a bearing block secured thereto, and a vertical wheel supporting spindle journaled in said bearing block, a distributing cylinder at the rear end of said receptacle, and means operative along the bottom thereof in a manner to convey the material to said cylinder.

7. A manure spreader including, in combination, axle members, a receptacle, said receptacle including bed frame members upon opposite sides thereof and below said axle members, said bed frame members being inclined inward and upward at their forward ends, a bearing block secured thereto, a caster wheel mechanism including a vertical spindle, said spindle journaled in said bearing block, a distributing cylinder at the rear end of said receptacle, and means operative along the bottom thereof in a manner to convey the material to said cylinder.

8. A manure spreader including, in combination, axle members, a receptacle, said receptacle including bed frame members upon opposite sides thereof and below said axle members, said bed frame members being inclined inward and upward at their forward ends, a bearing block secured thereto, a caster wheel mechanism including a fork, a spindle, said spindle journaled in said bearing block, a tongue connected with said caster wheel mechanism, a draft attachment connected with the forward ends of said bed frame members, a distributing cylinder at the rear end of said receptacle, and means operative along the bottom thereof in a manner to convey the material to said cylinder.

9. A manure spreader including, in combination, a receptacle, said receptacle including longitudinally arranged bed frame members upon opposite sides thereof, a transverse frame member having its opposite ends secured to said side frame members, vertically arranged castings secured to said side frame members, stub axles secured to said castings above said transverse frame member, and a transversely arranged power transmitting shaft journaled therein below said transverse frame member.

10. A manure spreader including, in combination, a receptacle, said receptacle including longitudinally arranged bed frame members upon opposite sides thereof, a transverse frame member having its opposite ends secured to said side frame members, vertically arranged castings secured to said side frame members, stub axles secured to said castings, upwardly converging bars secured to said castings upon opposite sides thereof, a transverse member having its opposite end secured to the upper ends of said converging bars above the sides of said receptacle, and a transversely arranged power transmitting shaft journaled in said castings below said receptacle.

11. A manure spreader including, in combination, a receptacle, axles projecting outward from the sides and above the bottom thereof, carrying wheels mounted upon said axles, gear members secured to said wheels, a power transmitting shaft journaled below said receptacle, pinions loosely mounted upon opposite ends of said shaft and engaging with said gear members, said pinions having ratchet teeth thereon, pawls and pawl carrying plates having said pawls mounted thereon, said plates having hub portions secured to said shaft and said pawls engaging with said ratchet teeth, one of said plates having clutch teeth upon its inner surface, a sprocket wheel slidably mounted upon the hub of said plate and provided with clutch teeth adapted to engage with the teeth thereon, a distributing cylinder, and power transmitting means connecting said sprocket wheel with said cylinder.

12. A manure spreader including, in combination, a receptacle, axles and carrying wheels mounted thereon, gear members secured to said wheels, a power transmitting shaft journaled below said axles, pinions loosely mounted upon opposite ends of said shaft and engaging with said gear members, pawl and ratchet mechanism adapted to connect said pinions with said shaft, a distributing cylinder, and power transmitting means connecting said cylinder with said shaft, including a clutch mechanism, a rock shaft mounted in bearings below said receptacle and in front of said power transmitting shaft, clutch shipping mechanism, including a lever arm, a lever arm mounted upon the rock shaft in a manner to have a limited rotative movement thereon, a link connection between said lever arms, a wheel segment secured to one end of said rock shaft, a hand lever mounted on said receptacle and having a flexible connection with said segment, a lever arm secured to the opposite end of said rock shaft, end-gate controlling levers having their forward ends pivotally connected with the sides of said receptacle, an end-gate connected with the rear ends of said levers, and link connections between said controlling levers and said wheel segment and said lever arm at opposite ends of said rock shaft.

FRANK W. RICE.

Witnesses:
W. B. KENDIG,
F. E. SOUTHMAYD.